April 14, 1970  R. A. SHUEY, JR  3,506,174
APPARATUS FOR HANDLING AN ELONGATE MEMBER
Filed Aug. 24, 1967  6 Sheets-Sheet 1
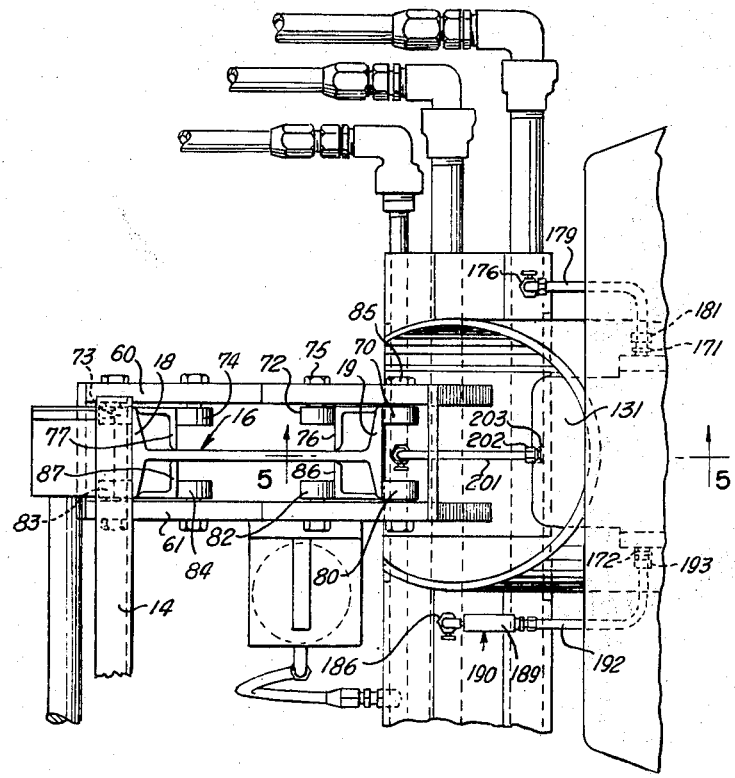
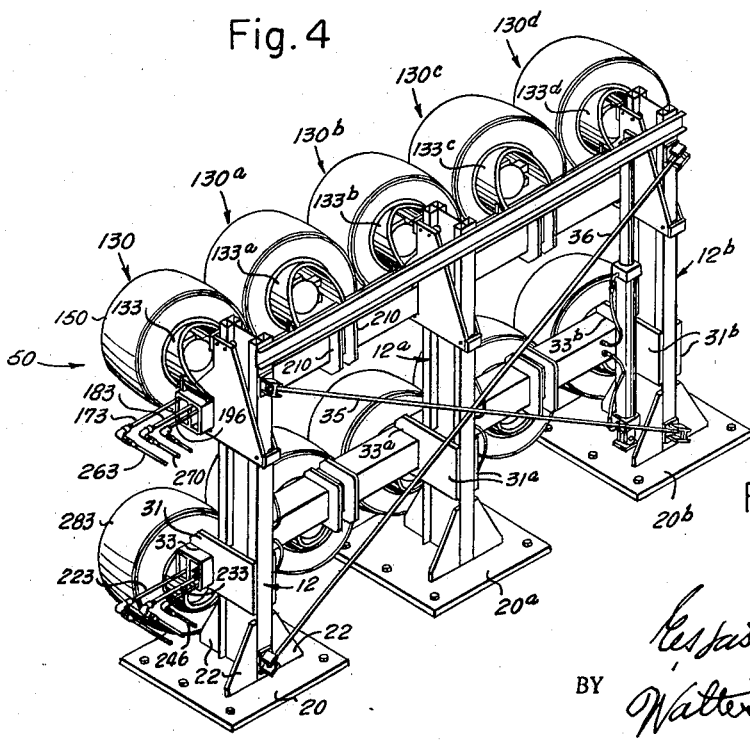
Fig. 4
Fig. 1
INVENTOR
Robert A. Shuey
BY
ATTORNEYS INVENTOR
Robert A. Shuey
BY
ATTORNEYS INVENTOR
Robert A. Shuey INVENTOR
Robert A. Shuey

BY
ATTORNEYS

INVENTOR
Robert A. Shuey

BY
ATTORNEYS

April 14, 1970     R. A. SHUEY, JR     3,506,174
APPARATUS FOR HANDLING AN ELONGATE MEMBER Filed Aug. 24, 1967     6 Sheets-Sheet 6

INVENTOR
Robert A. Shuey

BY *Hastings Ackley and Walter J. Jagmin*
ATTORNEYS

United States Patent Office 3,506,174
Patented Apr. 14, 1970

3,506,174
APPARATUS FOR HANDLING AN
ELONGATE MEMBER
Robert A. Shuey, Jr., 4405 Highland Drive,
Dallas, Tex. 75205
Filed Aug. 24, 1967, Ser. No. 662,999
Int. Cl. B65h 17/20
U.S. Cl. 226—108                                    11 Claims

ABSTRACT OF THE DISCLOSURE

An apparatus for moving an elongate member such as pipe or cable onto a vehicle during the laying or taking up of the pipe or cable, with the apparatus having a plurality of pairs of vertically aligned wheels individually driven by individual motors between and by which the pipe is movable relative to the vehicle.

---

This invention relates to an apparatus and method for handling elongate members such as pipe, cable and the like.

An object of the invention is to provide a new and improved apparatus for laying or taking up an elongate member, such as pipe, cable and the like, from or onto a vehicle which permits a predetermined longitudinal force to be imparted to the pipe or cable during the laying or taking up of the pipe or cable.

Another object is to provide an apparatus for laying pipe or cable which has a plurality of gripping means for gripping the pipe at a plurality of longitudinally spaced locations along the pipe so that the effective force with which the elongate member is gripped at any one location is sufficiently low that the pipe or cable and its coating will not be damaged thereby.

Still another object is to provide an apparatus for handling pipe or cable wherein the gripping means also cause a longitudinal force to be exerted on the pipe or cable.

A further object is to provide an apparatus for handling an elongate member wherein the gripping means are used to move or restrain movement of the pipe longitudinally relative to the vehicle with an adjustable predetermined force so that the longitudinal forces exerted on a portion of the elongate member between the apparatus and the ground may be varied by varying the speed with which the pipe is caused or permitted to move through the apparatus.

A still further object is to provide an apparatus for moving an elongate member such as a pipe, cable and the like relative to a vehicle which includes a frame having a lower set of wheels mounted thereon for rotation about fixed horizontal axes spaced longitudinally along the path of movement of the elongate member relative to the vehicle, a set of upper wheels above the lower set which are aligned vertically with the lower wheels and are movable vertically relative thereto, means for biasing the upper wheels downwardly relative to the lower wheels whereby the aligned pairs of wheels forcibly grip the elongate member at a plurality of longitudinally spaced locations therealong, and individual motors for rotating the wheels.

Another object is to provide an apparatus of the type described wherein the wheel motors are connected in parallel across the circulating circuit of a variable volume pump whereby all the wheels are caused to rotate at the same speed and exert the same longitudinally directed forces on the pipe or cable which is engaged by the wheels.

Still another object is to provide an apparatus of the type described where the circulation of the hydraulic fluid through the pump and the motors may be selectively varied both as to rate and direction of circulation in order that in certain installations, such as a barge or ship, the apparatus may be controlled to compensate for movement of the ship caused by wave action, wind and the like and maintain a predetermined longitudinal force, either compressional or tensional, on the portion of the pipe or cable which extends from the ship.

Another main object of the invention is to provide a new and improved method for moving a continuous elongate member, such as a pipe or cable, relative to a vehicle which includes gripping such member at the vehicle with a predetermined force at a plurality of longitudinally spaced locations therealong parallel to the direction of movement of the vehicle, and moving the elongate member longitudinally relative to the vehicle at such locations parallel to the direction of travel of the vehicle at a rate which varies in accordance with the longitudinal forces to which the elongate member is subjected to control or maintain uniform the longitudinally compressional or tensional forces exerted on the elongate member.

Still another object is to provide a new and improved method of handling an elongate member wherein the method includes the step of applying a forward propelling force to the vehicle which tends to move the vehicle forwardly at a speed greater than the speed with which the gripping means move the elongate member relative to the vehicle to cause the elongate member rearwardly of such locations to be under tension.

An object of the invention is to provide a new and improved apparatus and method for controlling longitudinal movement of an elongate member relative to a vehicle on which at least a portion of the elongate member is supported, the vehicle being movable parallel to the elongate member by means carried by the vehicle which are adapted to grip the elongate member at a plurality of longitudinally spaced locations therealong and control relative longitudinal movement between the vehicle and the elongate member to cause portions of the elongate member to be subject to variable predetermined longitudinally directed forces, tensional if the vehicle is subjected to a propelling force which tends to move it forwardly at a greater speed than the apparatus causes or permits rearward longitudinal movement of the elongate member relative to the vehicle, and compressional of the apparatus moves the lenogate member rearwardly relative to the vehicle while the vehicle is not being propelled forwardly by other propelling means or is being propelled forwardly by such propelling means at a speed slower than the rate of rearward movement of the elongate member relative to the vehicle caused by the apparatus.

Additional objects and advantages of the invention will be readily apparent from the reading of the following description of a device constructed in accordance with the invention, and reference to the accompanying drawings thereof, wherein:

FIGURE 1 is a perspective schematic view, with some fittings and conduit means omitted, of an apparatus embodying the invention;

FIGURE 4 is a fragmentary top view taken on line 4—4 of FIGURE 3;

Figure 2:
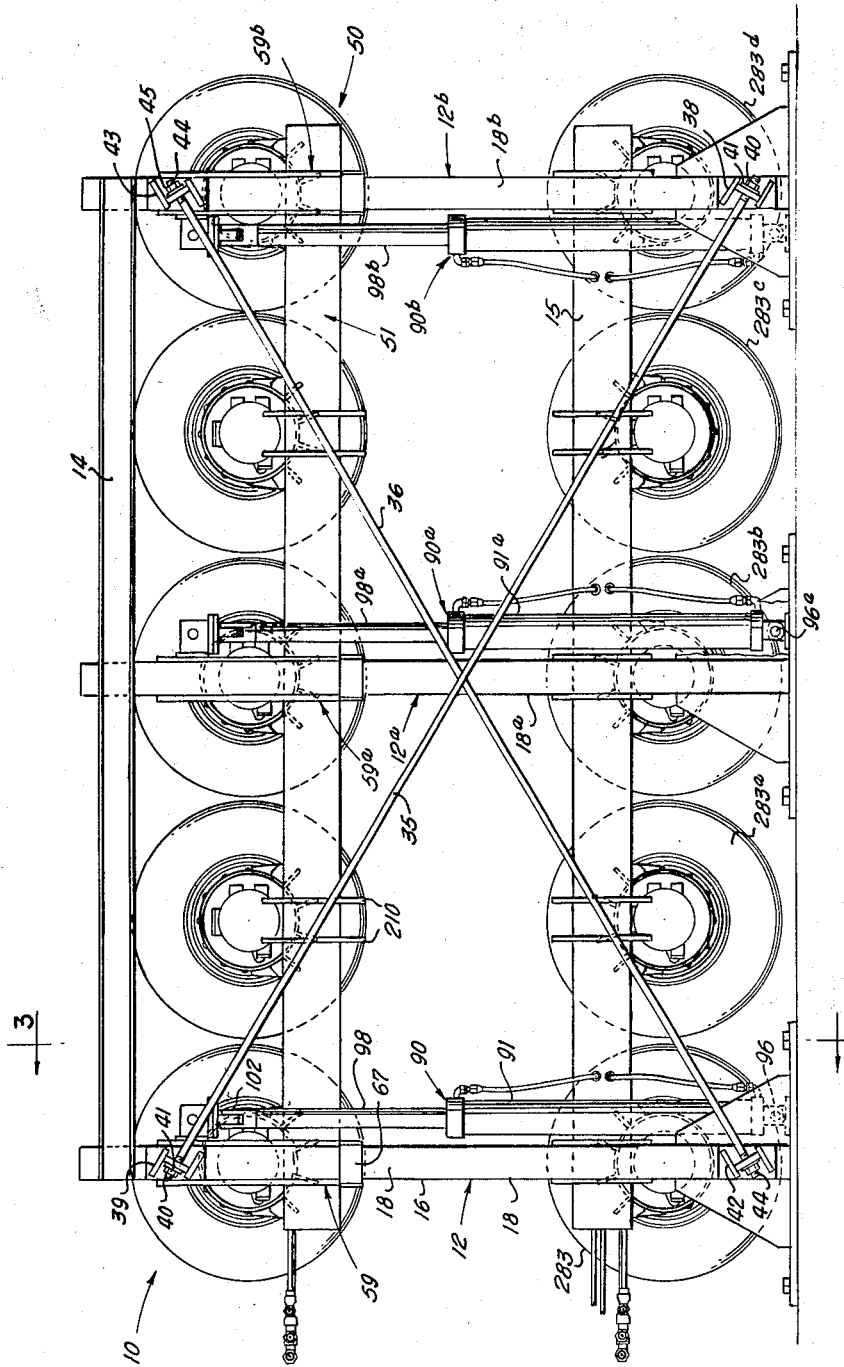
FIGURE 2 is a rear view, with some fittings and conduits omitted, of the apparatus.
Figure 3:
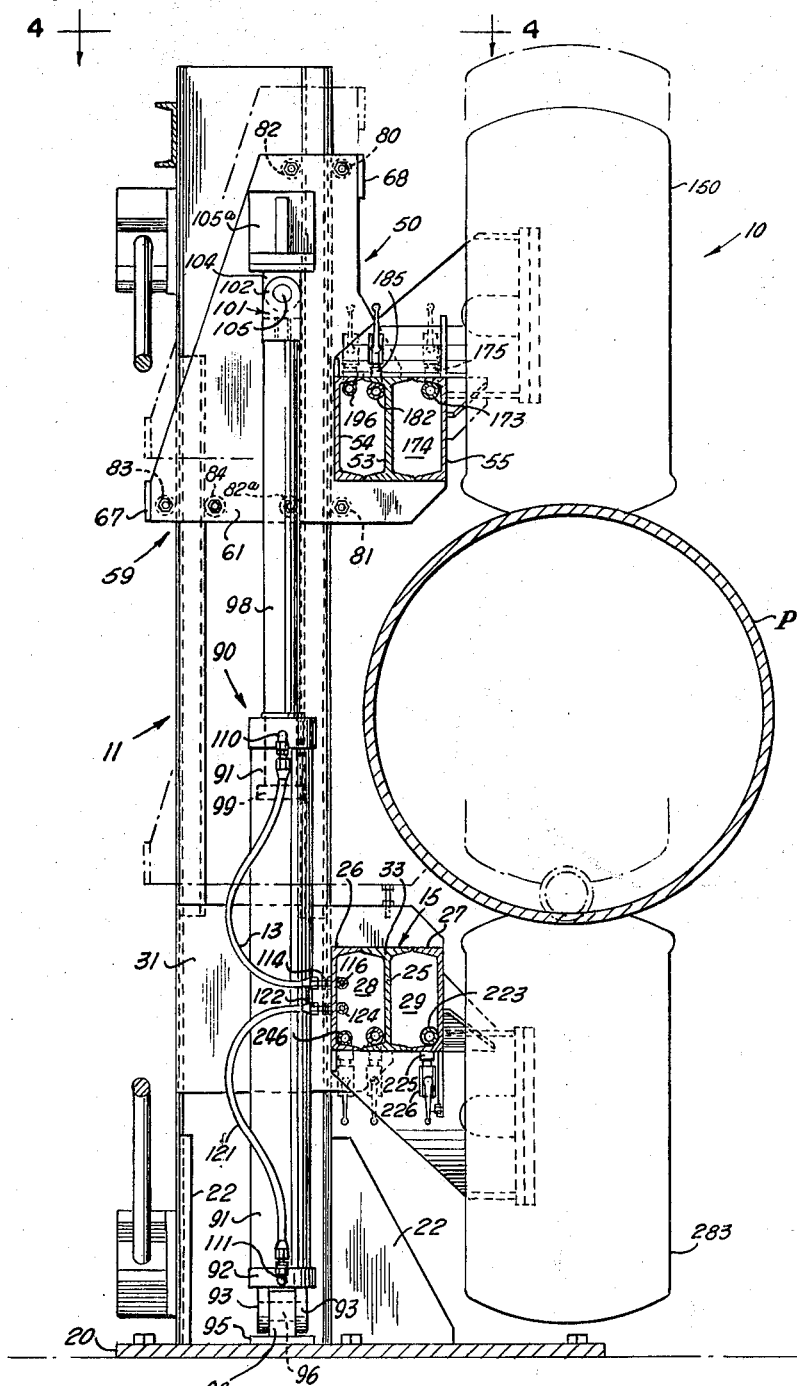
FIGURE 3 is a vertical sectional view taken on line 3—3 of FIGURE 2.
Figure 5:
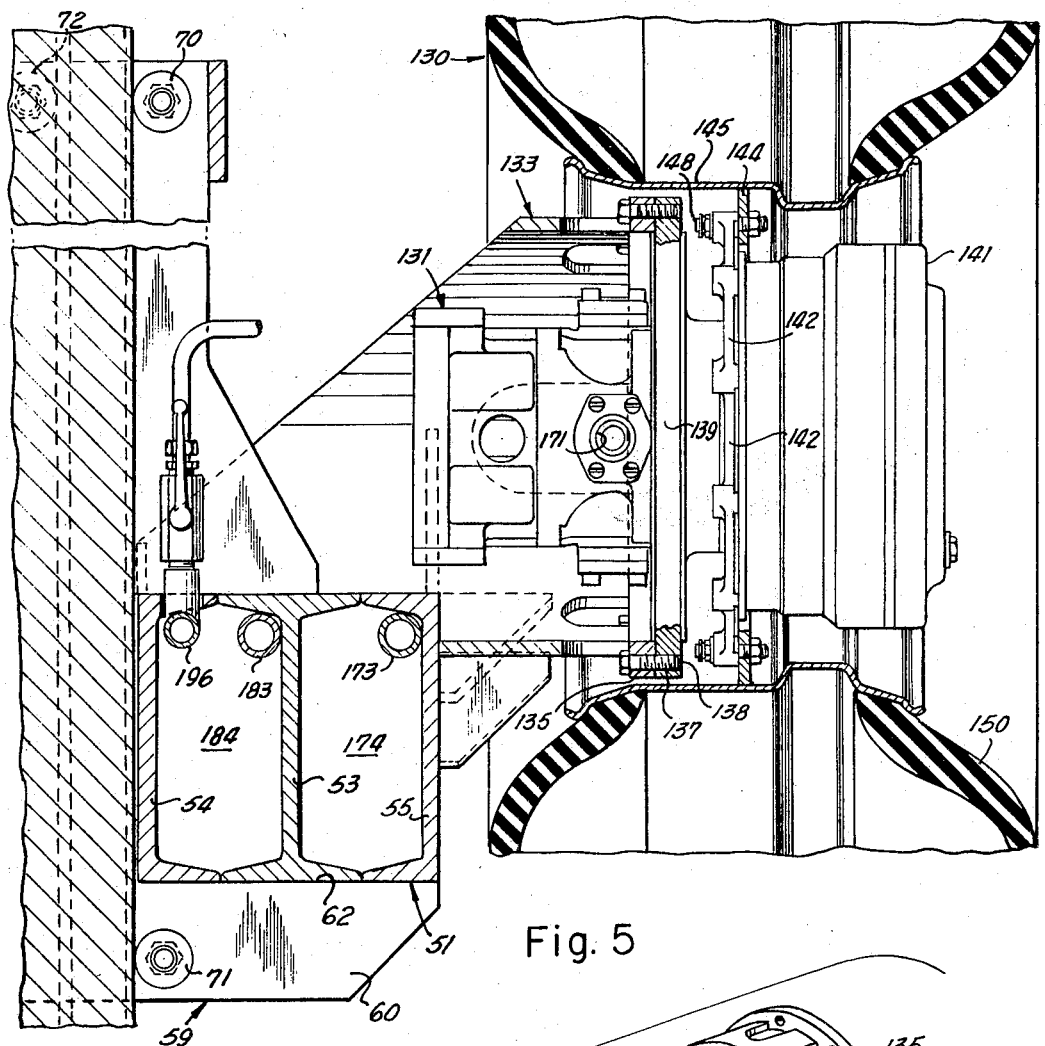
FIGURE 5 is a sectional view taken on line 5—5 of FIGURE 4.
Figure 6:
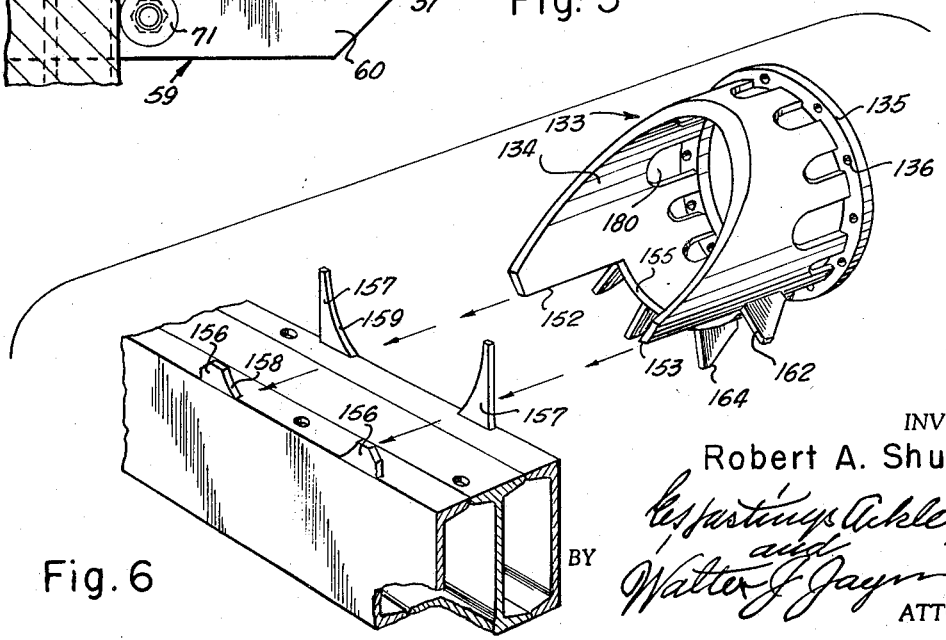
FIGURE 6 is a fragmentary exploded view showing a mounting bracket of a wheel motor of the apparatus.

Referring now to the drawings, the pipe handling apparatus 10 embodying the invention includes a base frame 11 which includes three vertical columns 12, 12a and 12b which are connected at their upper ends by a horizontal top beam 14 and at a lower location by a lower horizontal beam 15. The vertical column 12 may include an I-beam 16 having a web 17 and rear and front flanges 18 and 19, respectively. The lower end of the I-beam rests on and is secured by welding to a horizontal foot plate 20. Substantially triangularly shaped gusset plates 22 connect the foot plate and the I-beam.

The vertical columns 12a and 12b are identical in structure to the column 12 and, accordingly, the elements of the columns 12a and 12b have been provided with the same reference numerals, to which the subscripts a and b, respectively, have been added, as the corresponding elements of the column 12. The web of the top beam 14 abuts the rear flanges 18, 18a and 18b of the I-beam of the three columns and is secured thereto by welding.

The lower horizontal beam 15 includes a central I-beam 25 and rear and front channel members 26 and 27, respectively, which are welded to the I-beam to provide the beam with the horizontal passages 28 and 29. The outside surface of the web of the rear channel member abuts the front flanges 19, 19a and 19b of the vertical columns and is welded thereto. Pairs of brace plates 31, 31a and 31b are welded to the flanges of the I-beams of the columns 12, 12a and 12b, respectively, and have outwardly opening recesses 33, 33a and 33b in which the lower beam 15 is received. The surfaces of the brace plates defining these recesses abut the beam 15 and the beam is welded to the brace plates.

Diagonally extending tie bars 35 and 36 connect the top and lower ends of the end vertical columns 12 and 12b. The lower end of the tie bar 35 extends through an aperture in a bracket 38 secured to the rear flange 18b of the column 12b by welding and its upper end extends through an aperture of a bracket 30 which is welded to the rear flange 18 of the vertical column 12. The tie bar 40 is placed under tension by means of the nuts threaded on its opposite end portions which bear against washers 41 which are interposed between the nuts and the brackets. The tie bar similarly has its lower end extending through an aperture in a bracket 42 welded to the flange 18 of the column 12 and its upper end extending through suitable aperture in a bracket 43 welded to the outer flange 18c of the column 12c. The tie bar 36 is placed under tension by means of nuts 44 threaded on its upper end portions which bear against washers 45 interposed between the brackets and the nuts. It will be apparent that the frame 11 due to the rigid connection of its columns 12, 12a and 12b by the beams 14 and 15, and the diagonally extending tie bars 35 and 36 is very rigid. The foot plates 20, 20a and 20b may be bolted or otherwise rigidly secured to a vehicle, such as a barge, vessel, or land vehicle.

A carriage 50 is mounted for limited vertical movement on the columns 12, 12a and 12b of the frame and includes a horizontal beam 51 which may be formed of a central I-beam 53 and rear and front channel members 54 and 55. The carriage beam at the locations of the columns 12, 12a and 12b is provided with guide assemblies 59, 59a and 59b. The guide assembly 59 includes a pair of parallel vertical side plates 60 and 61 which have slots 62 at their front ends through which the carriage extends. The I-beam is of course rigidly secured to the plates of the guide assembly 59 by welding. The plates are also secured at their rear lower ends by a bar 67 welded to their front edges and at the front upper ends by a bar 68 similarly secured thereto.

The plate 60 has six rollers 70, 71, 72, 72a, 73 and 74 rotatably secured to the plate by means of suitable bolts 75. The rollers 70 and 71 engage the front surface of the front flange 19 of the I-beam 12 while the rollers 72 and 72a engage the vertical rear surface of an angle member 76 welded to the I-beam 16. The roller 73 engages the rear surface of the rear flange 18 of the I-beam 16 while the roller 74 engages the vertical surface of an angle member 77 welded to the I-beam 16.

Rollers 80, 81, 82, 82a, 83 and 84 are rotatably mounted on the guide side plate 61 by means of bolts 85. The rollers 80 and 81 engage the front surface of the front flange 19 of the I-beam, the rollers 82 and 82a engage the rear vertical surface of an angle member 86 welded to the I-beam, the roller 83 engages the rear surface of the rear flange 18 of the I-beam 16, and the roller 84 engages an angle member 87 welded to the I-beam 16.

The guide assembly 59 thus guides the vertical movement of the carriage due to the engagement of its side plates with the side surfaces of the angle members secured to the I-beam 16 and also by the engagement of its rollers with the angle members 76, 77, 86 and 87 and the flanges of the I-beam 16.

The guide assemblies 59a and 59b are identical to the guide assembly 59, and, accordingly, their elements have been provided with the same reference numerals, to which the subscripts a and b, respectively, have been added, as the corresponding elements of the guide assembly 59.

The carriage 50 is movable on the frame 11 by hydraulic rams 90, 90a and 90b. The hydraulic ram 90 includes a cylinder 91 whose bottom end is provided with a clevis 92 between whose legs 93 is received the upstanding lug 94 of a bracket 95 welded to the foot plate 24. A suitable pin 96 extends through aligned apertures in the legs of the clevis and the lug of the bracket. The outer end of the rod 98 of the piston 99 of the hydraulic ram is provided at its upper end with a clevis 101 between whose legs 102 is slidably received the downwardly extending lug 104 of the bracket 105 rigidly secured, as by welding, to the side plate 61 of the guide assembly 59. A pin 105 extends through aligned apertures in the bracket and the clevis legs. The cylinder is provided with the usual fittings 110 and 111 at its opposite ends so that fluid under pressure may be admitted into and exhausted from the cylinder from either end of the cylinder to cause the carriage to be moved upwardly or downwardly on the frame 11 by the hydraulic rams.

The hydraulic rams 90a and 90b are similarly secured to the foot plates 20a and 20b of the columns 12a and 12b, respectively, and the upper ends of their piston rods 98a and 98b are similarly secured to the guide assemblies 59a and 59b. Accordingly, the elements of the hydraulic rams 90a and 90b and the means for securing them to the frame and the carriage have been provided with the same reference numerals to which the subscripts a and b, respectively, have been added, as the corresponding elements of the ram 90.

The fitting 110 is connected by means of a flexible conduit 113 and a fitting 114, which may extend through a suitable aperture in the flange of the rear channel member 26 of the beam 15 to a conduit 116 which extends through the horizontal passage 28 of the beam and whose end which extends through one end of the I-beam may be connected to a fitting 117 of a four-way valve 118. The other fitting 111 of the cylinder is similarly connected by a flexible conduit 121 and a fitting 122, which extends through a suitable aperture in the channel member 26, to a conduit 124 which extends through the beam passage 28 and whose outer end is connected to a fitting 125 of the four-way valve 118.

The fittings of the cylinders 91a and 91b are similarly connected to the conduits 116 and 124 by similar fittings and conduits and, accordingly, these means for connecting the cylinders of the rams 90a and 90b to the conduits 118 and 124 have been provided with the same reference numerals, to which the subscripts a and b, respectively, have been added, as the corresponding elements so connecting the opposite ends of the cylinder 90 to these conduits.

Wheels 130, 130a, 130b, 130c and 130d are mounted on the beam 51 of carriage for rotation by separate hydraulic motors 131, 131a, 131b, 131c and 134d. The motor 131 is secured to a mount bracket 133 which includes a substantially cylindrical body 134 provided at its outer end with an annular flange 135 having circumferentially spaced apertures 136 through which bolts 137 may extend into threaded bores 138 in the external annular flange 139 of the housing of the hydraulic motor 131. The hydraulic motors and the wheels driven thereby are commercially available as units, Model UMF 110, from Gar Wood Industries, Inc., of Hillsdale, Mich. These units include a speed reducing transmission or assembly 141 of the planet gear type to which the drive shaft, not shown, of the motor is connected. The annular output or drive flange 142 of the housing of the transmission is connected to the internal annular flange 144 of the rim 145 of the wheel 130 by means of bolts 148 which extend through suitable apertures in the wheel and drive flanges. The wheel of course includes the usual rubber tire 150 which is mounted on the rim 145.

The cylindrical body 134 of the motor mount bracket 133 is cut out to provide the downwardly facing horizontal surfaces 152 and 153 which are adapted to rest on top of the beam 51 and a vertical arcuate surface 153 which is adapted to abut the vertical front surface of the channel member 55. The beam may also be provided with a pair of rear lugs 156 and a pair of front lugs 157 whose surfaces 158 and 159, respectively, are of the same radius of curvature as the external surface of the cylindrical body 134 and which abut the cylindrical body to help support the motor mount bracket. The tubular cylindrical body 134 is also provided with a plurality of radially outwardly extending lugs 161 whose surfaces 162 are also adapted to engage the vertical surfaces of the channel member 55 to provide further rigidity to the support and mounting of the motor mount bracket. The motor mount bracket is welded to the beam and to its lugs at locations of contact therewith.

The motor 131 is of the type whose speed of rotation of whose drive shaft (not shown) varies directly in accordance with the rate of circulation of fluid between its opposed ports 171 and 172 and the direction of rotation of the drive shaft depends on the direction of circulation of the hydraulic fluid between these ports. The port 171 is connected to a main hydraulic fluid conduit 173, which extends through the longitudinal passage 174 of the beam 51 of the carriage defined by the I-beam 53 and the channel member 55 by means of a T-coupling 175 connected in the main conduit 173 which extends upwardly through a suitable aperture in the top flange of the channel member 54, a manually operable shut off valve 176 connected to the T-coupling by a nipple 177, a conduit 179 which extends inwardly into the tubular cylindrical body 134 through a side window 180 thereof, and the fitting 181. The other port 172 of the motor 131 is connected to a main conduit 183, which extend longitudinally through a passage 184 defined by the I-beam 53 and the channel member 54 by means of a T-coupling 185 connected in the main conduit 183, a manually operable shut off valve 186 connected to the T-coupling by a nipple 187, a conduit 188, a throttle valve 189, which may be of the needle valve type and have a rotatable operator member 190 for adjusting the effective orifice of the throttle valve, a conduit 192 and a fitting 193 connected in the port 172.

Exhaust or overshot oil from the motor flows from the motor to an exhaust conduit 196, which extends longitudinally through the passage 184 of the beam 51, by means of a T-coupling 197 connected in the exhaust conduit, a nipple 198, a shut off valve 199, a conduit 201 and a fitting 202 threaded in the exhaust port 203 of the motor. The speed of rotation of the hydraulic motor 131 is adjustably limited by the throttle valve.

The motors 131a, 131b, 131c and 131d are mounted on the beam 51 of the carriage and are connected to the main conduits 173, 183, and 196 in the same manner as the motor 131, and, accordingly, the elements of the means for mounting the motors 131a, 131b, 131c, and 131d and connecting them to these conduits have been provided with the same reference numerals, to which the subscript a, b, c and d, respectively, has been added, as the corresponding elements of the like mounting and connecting means of the motor 131.

A pair of C-shaped brace or clamp plates 210 are secured to the beam 51 at the location of the motor mount bracket 133a and are welded thereto to give greater strength and rigidity to the beam at that location, and a similar pair of brace plates 211 are secured to the beam 51 at the location of the motor mount bracket 133c for the same purpose.

A plurality of lower wheels 215, 215a, 215b, 215c and 215d, drive by hydraulic motors 216, 216a, 216b, 216c and 216d, respectively, are mounted on the lower beam 15 of the apparatus by motor mounts 217, 217a, 217b, 217c and 217d, respectively, in the same manner as the wheels 130 and motor 131 are mounted on the beam 51. The lower wheels and their hydraulic motors and mounts therefor being identical to the wheels 130 and their motors 131 and their mounts 133, will not be described in greater detail herein. The speed of rotation of the motor 216 varies directly in accordance with the rate of circulation of hydraulic fluid between its opposed ports between its fittings 221 and 222 which are threaded into opposed ports of its housing and the direction of rotation of the drive shaft of the hydraulic motor depends on the direction of circulation of the hydraulic fluid between these ports. The fitting 221 of the motor 216 is connected to a main hydraulic fluid conduit 223 which extends through the longitudinal passage 29 of the beam 15 by a T-coupling 225 connected in the main conduit 223 which extends downwardly through a suitable aperture in the bottom flange of the channel member 27, a manually operable shut off valve 226 connected to the T-coupling by a nipple 227 and a conduit 228. The other port of the motor 216 is connected to a main conduit 233, which extends longitudinally through the passage 28 of the beam 15 by means of a T-coupling 235 connected in the main conduit 233 and manually operable shut off valve 236 connected to the T-coupling by a nipple 237, a conduit 238, a throttle valve 239 and a conduit 242 which is connected to the fitting 221. The exhaust or overshot oil from the motor 216 flows to an exhaust conduit 246 which extends longitudinally through the passage 28 of the beam 15 by means of a T-coupling 247 connected in the exhaust conduit 246, a conduit 248, a manually operable shut off valve 249 and a conduit 251. The motors 216a, 216b, 216c and 216d are mounted on the beam 15 and are connected to the main conduits 223, 233 and 246 in the same manner as the motor 216 and, accordingly, the elements of the means for mounting the motors 216a, 216b, 216c and 216d and connecting them to these conduits have been provided with the same reference numerals, to which the subscript a, b, c and d, respectively, has been added as the corresponding elements of the like mounting and connecting means of the motor 216. The main conduit 173 is connected to one fitting 260 connected in a port of the main pump 261 of a pump unit or assembly 262 by a flexible conduit 263, a T-coupling 264 and a conduit 266. The other main conduit 183 is connected to the other port fitting 268 of the pump 261 by a flexible conduit 270, a T-coupling 271 and a conduit 272. The exhaust conduit 196 of the carriage motors 131 is connected to a reservoir or tank 275 by means of a flexible conduit 276, a T-coupling 277, a conduit 278, a heat exchanger 279 and a conduit 280.

The main conduit 223 of the lower set of fixed hydraulic motors is connected to the port fitting 271 of the main pump 261 since it is connected to the T-coupling 264, the main conduit 233 is connected to the port fitting 260 since it is connected to the T-coupling 264, and the exhaust conduit 246 is connected to the tank 275 since it is connected to is connected to the T-coupling 277.

Figure 8:
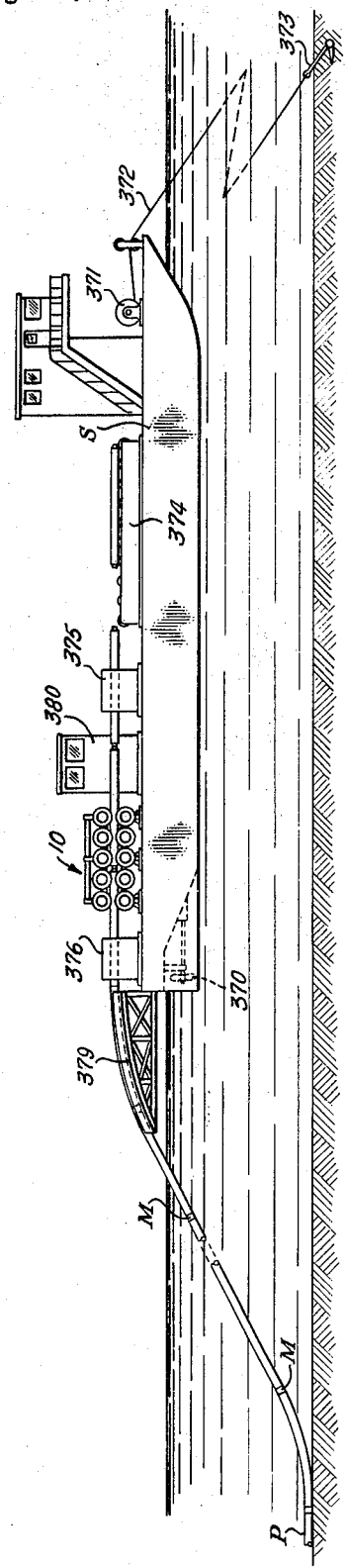
FIGURE 8 is a schematic illustration of a ship for laying or taking up pipe provided with the pipe handling apparatus embodying the invention.

Due to this connection of the carriage motors 131 and the fixed motors 216 to the pump, the two sets of motors will rotate in opposite directions. For example, if the carriage motors are rotating their wheels 130 in a clockwise direction as seen in FIGURE 8, the motors 216, 216a, 216b, 216c and 216d are rotating their wheels 283, 283a, 283b, 283c and 283d, respectively, in a counterclockwise direction. A bypass conduit 285, in which a pressure regulator valve 286 is connected, is connected across the conduits 266 and 277 by means of T-couplings 287 and 288 connected in the conduits 266 and 272, respectively. The valve 286 may be movably opened to permit restricted flow between the conduits 266 and 277 for a purpose to be described below.

A suitable pressure gauge 290 is connected across the conduits 266 and 277 by means of a conduit 292 and T-couplings 293 and 294 connected in the conduits 266 and 272, respectively. The pressure gauge 290 gives a visual indication of the pressure in either the lines 266 or 272 depending on the direction of circulation of the hydraulic fluid by the pump 261.

The pump unit or assembly 262 is of a type commercially available from Gar Wood Industries, Inc. of Hillsdale, Mich., and includes a Gar Wood Series 246 variable volume pump 260 whose operation is controlled by a control assembly 301 available from Gar Wood Industries, Inc., as a Model No. SC2R control. The pump 260 has a mechanically movable element which may be moved by suitable means of the control assembly to change the direction and also rate of circulation of the hydraulic fluid by the pump by a pneumatic ram 302 whose piston 303 is connected by a suitable linkage 304 to the control assembly 301. The pump unit also includes a control pump 305 which supplies fluid under pressure to the control assembly 301 by means of a conduit 306 and a supercharge pump 308 which delivers hydraulic fluid under pressure to the control pump through the conduit 309 and to the main pump 261 through a conduit 310. The control pump provides a force for actuating a pressure compensating means of the control assembly which prevents the pressure in whichever conduits 266 or 272 to which the pump is moving fluid from exceeding a predetermined value by causing the rate of flow through the pump to decrease if such pressure tends to exceed such predetermined value. The piston of the ram thus in effect sets the direction and maximum rate of flow of the circulating hydraulic fluid as long as such pressure does not exceed a predetermined value which may be set by a suitable manually operable means, not shown, of the control assembly. The control assembly will not be described herein since its structure and mode of operation is well known. The inlet of the super-charge pump is connected to the reservoir 275 through a conduit 312, a filter 313 and a conduit 314. The reservoir 275 is closed and the hydraulic fluid therein is maintained under a predetermined pressure, for example twelve pounds per square inch, by air under pressure introduced into the upper end of a tank through a conduit 316 which is connected to any suitable source of air under pressure, such as a compressor or the like.

The ram 302 includes a cylinder 318 having fittings 319 and 320 at its opposite ends by means of which air under pressure may be admitted into or exhausted from the cylinder on opposite sides of the piston 320 of the ram. The position of the piston and, therefore, the direction and rate of circulation of hydraulic fluid by the main pump 261 is controlled by a two-position four-way valve 325 which may be of any suitable type, such as the valve commercially available from the Westinghouse Air Bole Company of Lexington, Ky., as model Wabco HR2, which has a pair of fittings 326 and 327 which are connected to the fittings 319 and 320 of the ram cylinder by the conduits 328 and 329, respectively. The valve also has an inlet fitting 331 which is connected to the supply conduit of air under pressure 316 by means of the conduit 332 and a T-coupling 333 connected in the compressed air supply conduit 316. The valve 325 also has a pair of exhaust ports 335 and 336 and an operator lever or member 337. By appropriate manipulation of the operator member 337 of the valve, air under pressure may be admitted by the valve 325 to one or the other inlet fitting 319 or 320 of the ram cylinder 318 while air is allowed to escape from the cylinder through the other fitting to cause movement of the piston in a desired direction in the cylinder. When the piston has reached a desired position, the lever may be manipulated to cause air under pressure to be admitted to both sides of the cylinder to cause the piston to be held in such adjusted position.

The valve 118 which controls operation of the hydraulic rams 90, 90a and 90b may be any suitable four-way valve having a control member 340. The valve 118 by proper manipulation of the operator member 340 selectively provides fluid communication between the conduits 341 and 342 and fittings 117 and 125 thereof. In one position of the control member the conduit 341 is in fluid communication of the operator member 340 while the conduit 342 is in fluid communication with the inlet fitting 117. In a second position of the control member, the conduit 342 is in fluid communication with the fitting 117 while the conduit 341 is in fluid communication with the fitting 125 and conduit 124. The conduits 341, and 342 are connected to the port fittings 343 and 344, respectively, of a pressure compensated pump 345 of a pump unit 346 commercially available as Webster C3P pump available from the Sta-Rite Industries, Inc., Racine, Wis.

Hydraulic fluid under pressure is supplied to the pump 345 through a conduit 347 which connects an inlet fitting 348 of the pump to the conduit 312 by means of a T-coupling 349 connected in the conduit 312. Exhaust or overshot oil from the pump 345 is conducted back to the reservoir 275 by means of a conduit 350 one end of which is connected to the exhaust port 351 of the pump and whose other end is connected to the conduit 278 by means of a T-coupling 352 connected therein upstream of the heat exchanger 279.

A check and pressure regulator valve 355 is connected across the conduits 116 and 124 and permits flow of fluid from the conduit 116 to the conduit 124 when the pressure in the conduit 116 exceeds a predetermined value, for example, 500 pounds per square inch, to limit the force tending to move the pistons of the hydraulic rams 90, 90a and 90b to a predetermined value. The pump unit 346 has means limitng the pressure of the hydraulic fluid in the conduit 124, when the valve 118 is permitting fluid to flow from the pump fitting 344 to the conduit 124 and from the conduit 116 to the pump fitting 343, to a predetermined value, for example, 1000 pounds per square inch. As a result therefore when the fourway valve 118 is adjusted to permit fluid to be admitted to the conduit 124 and exhausted from the conduit 116, the carriage moves upwardly on the frame and when the valve 118 permits fluid under pressure to be admitted to the conduit 116 and exhausted from the conduit 124, the hydraulic rams move the carriage downwardly and when its downward movement is arrested, bias the carriage downwardly with a predetermined force.

The pump units 262 and 346 are driven by a suitable prime mover, such as a diesel engine 360, whose output shaft has a constant speed of rotation. The input shaft of the pump 261 is thus driven at a constant speed and the desired maximum rate and direction of circulation of the hydraulic fluid moved thereby of the hydraulic fluid pumped thereby will depend on the position of the piston 320 of the pneumatic ram 302 relative to its cylinder. The position of the piston of the pneumatic ram will set the pump to circulate the fluid at a certain rate to cause the motors to rotate the wheels at a certain speed and thus tend to move the pipe relative to the ship at a certain speed. The control assembly 301, however, causes the rate with which the pump circulates hydraulic fluid to vary to maintain the pressure at the pump outlet from exceeding a predetermined value as preset by a suitable manual control means of the control assembly. The speed of rotation of the wheels will thus vary in accordance with the effective longitudinal force being exerted by the hydraulic motors on the elongate member to maintain this force substantially constant.

When the piston 320 and the control assembly 301 are in the position wherein the pump is in a neutral or hold condition, the pump 260 prevents flow through the hydraulic circuits of the motors. As a result, the hydraulic motors then hold the wheels against rotation since the rotatable elements of these positive displacement type motors can rotate only when the incompressible hydraulic fluid can circulate therethrough.

Referring now particularly to FIGURE 8 of the drawings, the apparatus 10 is shown mounted on a vehicle, such as a ship S, which may be moved forwardly on a body of water by means of a propeller 370 driven in the usual manner by an engine of the ship or which may be propelled or pulled forwardly by means of a power winch 371 which reels in a cable 372 provided at its outer end with a suitable anchor 373 which may be moved by a suitable boat forwardly of the ship and dropped to engage the earth at the bottom of the body of the water forwardly of the ship. The ship may also have means such as winches, cables and anchors which extend to opposite sides of the ship to hold it against lateral movement in the water, or suitable propellers for exerting lateral forces on the ship for this purpose, such as those disclosed in the patent to C. W. Shaw, No. 3,321,925.

The ship may be provided with a suitable conveyor 374 on which sections p of pipe may be moved from storage areas into a suitable welding apparatus 375 mounted on the ship. The sections of the steel pipe are provided with protective coatings of cement or the like and have short opposite end portions uncoated so that adjacent ends of adjacent pipe sections may be welded together by the welding apparatus 375.

A coating apparatus 376 mounted adjacent the rear end of the ship applies a suitable layer m of a coating compound or mastic to the exposed end portions of the welded pipe sections before the pipe moves rearwardly off the rear end of the ship over a guide or supporting structure 379, commonly referred to as a "stinger." The stinger guides and directs rearward and downward movement of the pipe off the rear end of the ship. The pipe as it moves into the water is thus fully coated throughout its length.

The carriage wheels 130, 130a, 130b, and 215 are vertically aligned with and above the wheels 215, 215a, 215b, 215c and 215d, respectively, so that the pipe is engageable and is gripped by the five pairs of vertically aligned wheels at five longitudinally spaced locations as it moves rearwardly through the pipe handling apparatus 10.

The pump, the diesel engine and the controls for the apparatus may be located in a suitable housing 380 of the ship.

In use, if the water is relatively shallow, the ship may be propelled forwardly by the pipe handling apparatus without requiring the use of the ship's propelling means since the pipe remote from the ship is rigidly secured to a well head at the bottom of the body of the water or is rigidly secured to the earth by other suitable means and since the curvature of the portions of the pipe adjacent the ship's stern and the earth will in this case not be so great as to damage the somewhat flexible coating of the pipe.

The hydraulic fluid circulates of the pump unit 346 and the hydraulic rams and of the pump unit 262 and the wheel motors are completely filled with an incompressible hydraulic fluid, any air initially present in these circuits being bled off in the usual manner by means of suitable air bleeder valves, not shown.

Since the pump 261 is a variable volume pump and the hydraulic motors are of the positive displacement type, all the wheel motors are identical and all the throttle valves 189 are set to have substantially equal orifices, the speed of rotation of all the wheels for a given rate of circulation of the hydraulic fluid by the pump 261 will be constant and equal. The throttle valves are set to provide such restrictions to the circulation of the hydraulic fluid through the motors which will not interfere unduly with the proper operation of the motors at the particular range of speed at which it is desired to rotate the wheels and thus move the pipe, but which will prevent the motors of wheels which do not engage the pipe, as for example, as the exposed adjacent end portions of the welded pipe section move past a vertically aligned pair of wheels, from rotating too rapidly and also limit the flow of the hydraulic fluid through such motors since otherwise an undue proportion of the fluid being pumped by the pump would flow through the motors of such pair of wheels.

The diesel engine is then set in operation to cause operation of the two pump units 346 and 262 and the control valve 118 is set to supply fluid under pressure from the pump 345 outlet fitting 343 to the conduit 116 and, therefore, to the upper ends of the cylinders of the hydraulic rams 90, 90a and 90b and to permit the fluid to exhaust from the lower ends of the cylinders to the pump unit 334 through the conduit 124. The carriage is moved downwardly by the rams on the frame until its further downward movement is arrested by the engagement of the wheels 150 with the top surface of the sections of the pipe which are then being supported on the tires of the lower set of wheels 215. A downward force is then exerted continuously on the carriage by the hydraulic rams and causes the pipe to be gripped with a force predetermined by the setting of the pressure regulator valve 355.

The pump 261, which initially was set in its hold or neutral position preventing any circulation of hydraulic fluid to the hydraulic motors of the wheels, is then caused to attempt to circulate hydraulic fluid at a desired rate by operation of the valve 325 which causes the piston of the pneumatic ram to actuate the control assembly 301 and cause the pump to circulate fluid through the motors in such direction that the upper set of wheels are rotated in a clockwise direction, FIGURE 8, and the lower set of wheels are rotated in a counterclockwise direction. The control assembly, however, prevents the pump outlet pressure, or motor upstream pressure, from exceeding the predetermined value. The pipe is thus moved rearwardly relative to the ship by a predetermined force, the control assembly causing the rate or volume per unit of time of hydraulic fluid pumped by the pump varying in accordance with the upstream pressure of the motors which in turn varies with the resistance to the rotation of wheels and motors due to the engagement of the wheels with the pipe and therefor with the longitudinally directed compressional forces to which the pipe is subjected, if the pump outlet pressure tends to rise above the predetermined value. As a result, the rate of movement of the pipe by the apparatus decreases if such compressional forces tend to increase and decreases if such compressional forces tend to decrease.

The direction and force with which the pipe is being moved rearwardly by the apparatus can be determined by the pressure gauge 290. Should wave action tend to move the ship rearwardly, which would tend to impose an excessive rearward force on the pipe, the directions of rotation of the upper and lower sets of the wheels may actually be reversed to cause the pipe to be moved by the apparatus forwardly relative to the ship as the ship moves rearwardly to prevent excessive forces to be exposed on the portions of the pipe which extend rearwardly from the ship. Should wave action tend to make the ship move forwardly at a speed greater than the speed of movement of the pipe off the ship by the apparatus, the pipe will be placed under tension unless the operator by operation of the control valve 375 increases the possible maximum rate of circulation of fluid by the pump.

It will be apparent that since the tires of the wheels are, of course, filled with air under pressure, the wheels yield resiliently to accommodate variations in the thickness of the pipe. Since at any one time at least four pairs of the wheels are engaged with the pipe, the coating apparatus 376 may be located rearwardly of the pipe handling apparatus 10 so that the relatively soft or unset mastic is not engaged by the pipe.

The motors, since they are identical in structure and are connected in parallel across the port fittings 260 and 268 of the pump, exert substantially constant equal longitudinally directed forces on the pipe so that the force with which the pipe is gripped by the wheels and the longitudinal forces imparted to it by each pair of vertically aligned wheels may be relatively small and will not damage the pipe or its coating even though the total combined gripping and longitudinally directed forces exerted on the pipe by the five pairs of wheels may be very great.

The pump may, of course, be placed in its neutral or hold position by proper manipulation of the valve 325 when it is desired to hold the ship stationary as, for example, during the welding of adjacent pipe sections or other operations.

If the pipe is to be laid at the bottom of a body of water of considerable depth, it is desirable that the length of the pipe between the stern of the ship and the portion thereof resting on the earth be placed under tension to prevent the curvatures of the bent portions of the pipe adjacent the stern and the earth from exceeding predetermined limits which could result in damage to the coating of the pipe or to the pipe itself. In order to prevent the radii of curvature of these portions from decreasing below predetermined lengths, the ship is propelled forwardly by means of its propeller 370 or the power winch 371 with a force which would tend to move it forwardly, if the pipe handling apparatus were not operative, at a greater speed than the rate of rearward movement of the pipe relative to the ship caused or permitted by the pipe handling apparatus. The valve 325 is then adjusted to cause the upper sets of wheels to be rotated in a clockwise direction, FIGURE 8, and the lower set of wheels to rotate in a counterclockwise direction so that the pipe rearwardly of the pipe apparatus is placed under a desired tension predetermined by the setting of the control assembly 301. In this case, assuming the port fitting 260 is the outlet fitting of the pump the pressure at the other pump port fitting 268 and the conduit 272 will exceed the pressure at the port fitting 260 and in the conduit 266 and the pressure gauge 290 will then indicate the pressure at the port fitting 268. The rate of circulation of fluid through the pump permitted by the pump 261 will be varied in accordance with the pressure at the pump fitting 260 to maintain a predetermined maximum tension in the pipe P rearwardly of the apparatus 10.

Should the wave action cause the ship to tend to move rearwardly relative to the pipe the direction of rotation of the wheels may, of course, be reversed to cause the pipe to be actually pulled back onto the ship in order to maintain the desired tension on the pipe.

If it is desired to cause the motors to rotate at a set constant speed, the pressure regulator valve 286 is opened to such degree that the control assembly of the pump causes it to circulate fluid at its maximum rate, and since the valve 286 now permits a predetermined rate of flow therethrough, the rate of flow through the motors and, therefore, their speed of rotation will then be constant.

The apparatus 10 may, of course, also be used to take up pipe from the bottom of a body of water while maintaining a desired tension thereof by causing the force with which the propeller 370 or the winch 371 is tending to propel the boat forwardly to be decreased to such level that the apparatus 10 may move the ship rearwardly as it pulls the pipe forwardly relative to the ship. In this case also the rate and direction of circulation of the hydraulic fluid caused or permitted by the pump 261 may be changed by proper manipulation of the valve 345 to maintain a desired tension on the pipe even though wave action may tend to move the vehicle rearwardly or forwardly the maximum possible tension being as before predetermined by the setting of the control assembly 301.

While the apparatus 10 has been described in connection with the ship illustarted in FIGURE 8 as being used to lay or pick up pipe which is formed of sections which are welded to one another on the ship it may, of course, also be used to lay continuous pipe which may be wound on a reel such as that illustrated in the patents to Tesson, No. 3,327,438 and to Cox et al., No. 3,331,212.

Figure 9:
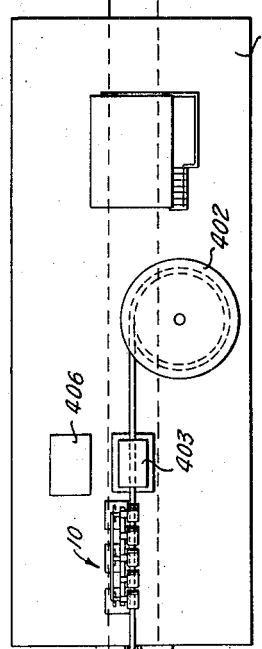
FIGURE 9 is a top view of a barge for laying or taking up pipe provided with the apparatus embodying the invention.
Figure 10:
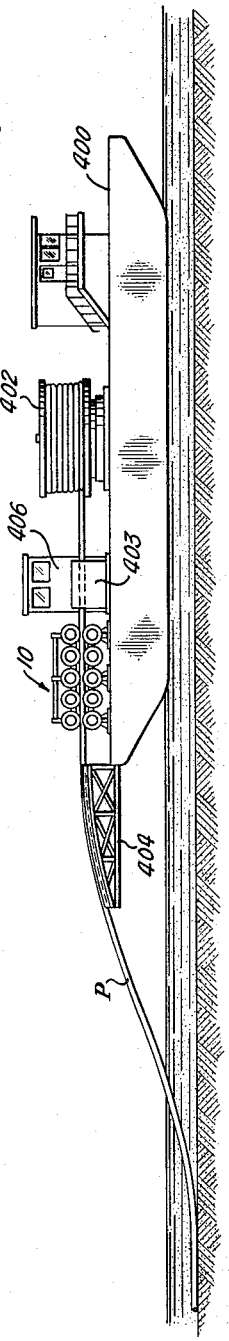
FIGURE 10 is a schematic side view of the apparatus illustrated in FIGURE 9.

Referring now particularly to FIGURES 9 and 10 of the drawings, the apparatus 10 is shown mounted on a vehicle or barge 400 which is shown afloat on a marsh or swamp through which a trench or ditch 401 has been dug in which the continuous pipe P, wound on the reel 402, is to be laid in the trench. The vehicle 40 may also have a pipe straightening apparatus 403 between the reel and the apparatus 10 and a stinger 404 for guiding and directing rearward and downward movement of the pipe off the vehicle 400. The pump units, diesel engine and controls of the apparatus 10 may be located in a housing 406 of the vehicle.

It will be apparent that the apparatus 10 may be used in the same manner as described above to unwind the pipe rearwardly off the reel 402 and move it rearwardly relative to the vehicle and if the pipe in the trench which is rigidly secured against rearward longitudinal movement in the trench, the rearward force imparted to the pipe by the apparatus 10 will force the vehicle forwardly over the marsh as it moves the pipe rearwardly off the vehicle. The force with which the pipe is moved rearwardly may, of course, be controlled in the same manner as described above in connection with the ship S.

It will be apparent that while the vehicle 400 has been shown as being afloat on marshy ground, it may, of course, be provided with wheels if the pipe is to be layed in a trench or ditch dug in firm ground.

While the apparatus 10 has been illustrated and shown as having five wheels on the carriage and five wheels on the frame it will be apparent it may be provided with any desired number of wheels as may be required in a particular application or by the nature of the elongate member. Due to the flexibility and resilence of the tires of the wheels the wheels will deform as required by the configuration of the pipe or cable at the locations of their engagement therewith.

Figure 7:
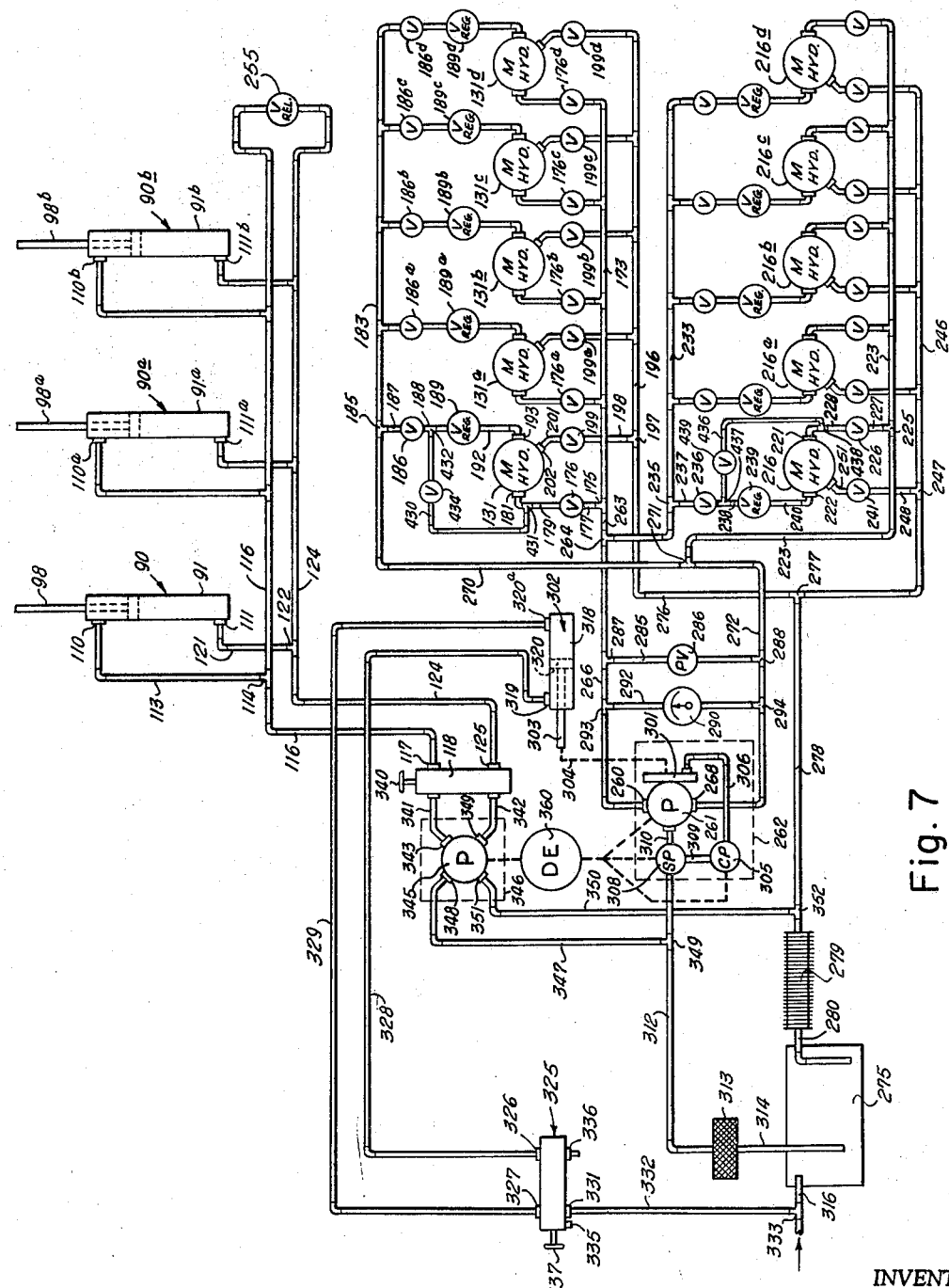
FIGURE 7 is a schematic diagram of the hydraulic system of the apparatus illustrated in FIGURES 1–6.

If desired, each of the motors may be provided with a bypass line, as illustrated in the case the motors 131 and 216 in FIGURE 7, to permit a particular motor to be rendered inoperative. For example, the bypass line 430 may be connected between the conduits 179 and 188 of the motor 131 by means of T-couplings 431 and 432 connected in the conduits 179 and 188. The bypass line is provided with a shut-off valve 434. Similarly, a bypass line 436 may be connected across the conduits 228 and 238 of the motor 216 by means of T-couplings 437 and 438 and a shut off valve 439 is connected in the bypass line. It will be apparent that when it is desired to render the wheel motor 131 inoperative, the shut off valves 176, 186 and 199 are closed and the shut off valve 434 is opened. Similarly, the valves 236, 226 and 241 are closed and the valve 439 is opened. As a result, the motors 131 and 216 may rotate freely, their bypass lines or conduits being open to permit circulation of the fluid moved by these motors as they are rotated due to the engagement of their wheels with the pipe which is moved longitudinally therebetween by the other pairs of wheels.

It will now be seen that a new and improved apparatus for handling elongate members, such as a pipe or cable, to lay the elongate member on the earth from a vehicle, such as a land vehicle or a ship, has been illustrated and described which permits a predetermined longitudinally directed force to be exerted on the elonagte member to cause or permit controlled longitudinal movement to occur between such vehicle and the elongate member either in the laying of the elongate member onto the earth from the vehicle or in picking up the elongate member from the earth and onto the vehicle.

It will further be seen that a new and improved method reversible motors and a variable volume pump having control means which control the direction and rate of circulation of fluid by or through the pump, a predetermined controlled longitudinal force may be exerted on the pipe or cable by means of the apparatus even though the force with which the vehicle tends to move forwardly or rearwardly varies suddenly as when the vessel is moved upwardly on or downwardly on a wave or when the vessel is subjected to gusts of wind.

It will further be seen that a new and improved method for controlling movement of an elonagte member relative to a vehicle has been described which includes the steps of gripping the member at the vehicle with a predetermined force at a plurality of longitudinally spaced locations therealong parallel to the direction of movement of the vehicle, and controlling the movement of the elongate member relative to the vehicle with individual separate means to subject the elongate member to a predetermined substantially constant longitudinally directed force, either compressional or tensional.

It will further be seen that the method, where the vehicle is a ship and afloat on a body of water, includes the additional step of maintaining a predetermined longitudinally directed force on the portion of the elongate member which extends from the ship into the water by varying the longitudinal forces applied to the elongate member in accordance with the variations in the direction of movement and the force of movement of the vessel to maintain a substantially constant longitudinally directed force on the elongate member.

It will further be seen that the method may include the step of applying a forward propelling force to the vehicle which tends to move the vehicle forwardly on the water at a speed greater than the speed with which the elongate member is being moved rearwardly relative to the vehicle by the apparatus to cause the elongate member rearwardly of the apparatus to be placed under tension.

It will further be seen that while a particular control means for the motors and pump has been illustrated and described, other suitable control means for varying the speed and direction of rotation of the wheels may be employed, for example, while a pneumatic ram has been shown and illustrated for controlling the pump unit 260, a hydraulic ram could be used for this purpose in which case a suitable supply ram would be provided with a suitable supply of hydraulic liquid under pressure for this purpose.

It will further be seen that while control means for the pneumatic ram and therefore for the pump and motor has been shown as a manually operable valve, that an automatic means could be used to control the valve 325 which would be responsive to the fluid pressure in the lines 266 and 272 between which the pump circulates the hydraulic fluid.

It will be apparent that while the apparatus embodying the invention has been illustrated and described as having two sets of wheels between which an elongate member may extend to be gripped thereby, that the apparatus could have more than two sets, for example, three sets of such wheels in which case the three sets of wheels would be mounted for rotation about axes lying in planes extending through the longitudinal axis of an elongate member extending therebetween and at angles of approximately 120° to each other.

The foregoing description of the invention is explanatory only, and changes in the details of the construction illustrated may be made by those skilled in the art.

What is claimed and desired to be secured by Letters Patent is:

1. An apparatus for handling an elongate member comprising: a support means; a plurality of sets of gripping means mounted on said support means, said gripping means of each of said sets being spaced longitudinally along the path of movement of an elongate member at longitudinally spaced locations therealong, the gripping means of each of said sets engaging the elongate members at locations circumferentially spaced from the locations of engagement of the gripping means of another of said sets; means for moving one of said sets of gripping means toward and away from an elongate member for causing said sets of gripping means to forcibly grip an elongate member therebetween at a plurality of longitudinally and circumferentially spaced locations therealong: and separate individual drive means for individually driving said gripping means and causing said gripping means to exert equal longitudinally directed force on an elongate member engaged by said gripping means to control longitudinal movement of the elongate member relative to said apparatus.

2. The apparatus of claim 1, wherein said gripping means comprise wheels mounted for rotation about axes perpendicular to the longitudinal axis of the elongate member and the axes of rotation of said wheels lie in vertical planes spaced longitudinally along the path of movement of the elongate member for causing the elongate member to be gripped at each such plane by one gripping means of each of said sets of gripping means.

3. The appaartus of claim 2, wherein said drive means comprise hydraulic motors.

4. The apparatus of claim 3, and means for circulating hydraulic fluid under pressure at a variable predetermined rate to said motors.

5. The apparatus of claim 4, wherein said motors are connected in parallel across said means for circulating hydraulic fluid.

6. The apparatus of claim 5, wherein said means for circulating hydraulic fluid includes a variable volume pump and control means for said pump responsive to the pressure of the hydraulic fluid being circulated by said pump for varying the rate of circulation of the fluid to prevent said pressure from exceeding a predetermined value.

7. An apparatus for controlling the longitudinal movement of a pipe comprising: a support frame; a plurality of first wheels mounted on said support frame for rotation about axes spaced longitudinally of and extending perpendicular to the path of longitudinal movement of an elongate member through said apparatus; a carriage mounted on said frame about said first wheels for movement toward and away from said first wheels; a plurality of second means mounted on said carriage for rotation about axes spaced longitudinally of and extending perpendicular to said path, the axes of rotation of said first and second wheels lying in vertical planes spaced along said path of movement for causing the elongate member to be engaged at each of said vertical planes by a first wheel and a second wheel; means for moving said carriage on said frame and causing said first and second wheels to engage an elongate member extending therebetween; and individual reversible hydraulic motors for each of said first and second wheels for controlling rotation of said wheels and causing said wheels to exert equal longitudinally directed forces on an elongate member engaged thereby.

8. The apparatus of claim 7, and means for controlling the circulation of hydraulic fluid through said motors to simultaneously control speed and direction of rotation of said wheels.

9. The apparatus of claim 8, wherein said means for moving said carriage comprises at least one ram connected to said carriage and said pump and for supplying fluid under pressure to said ram.

10. The apparatus of claim 7, and a variable volume pump operable by a substantially constant speed prime mover and having a pair of main conduits, the pump circulating hydraulic fluid between said main conduits selectively in either direction, said hydraulic motors having branch conduits connecting said motors in parallel across said main conduits.

11. The apparatus of claim 10, and shut-off valves in the branch conduits of at least one of said motors, and a bypass conduit connected across said branch conduits of said one of said motors between said motors and said shut-off valves, and a shut-off valve in said bypass conduit.

References Cited

UNITED STATES PATENTS

| 2,910,835 | 11/1959 | Timothy | 61—72.3 |
| 3,262,275 | 7/1966 | Perret | 61—72.3 |
| 3,321,925 | 5/1967 | Shaw | 61—72.3 |
| 3,390,532 | 7/1968 | Lawrence | 61—72.3 |

ALLEN N. KNOWLES, Primary Examiner

U.S. Cl. X.R.

226—177, 187, 188